United States Patent
Imoto et al.

[15] 3,650,805
[45] Mar. 21, 1972

[54] METHOD OF MANUFACTURING COATED PAPER

[72] Inventors: Saburo Imoto, 1652 Sakazu; Kyoichiro Ikari, 550 Yasue; Hirosaburo Mori; Tatsuaki Hattori, both of 1621 Sakazu, all of Kurashiki-shi, Japan

[22] Filed: June 28, 1968

[21] Appl. No.: 741,206

[30] Foreign Application Priority Data

June 30, 1967 Japan..................................42/42708

[52] U.S. Cl. .....................................117/62.2, 117/155 VA
[51] Int. Cl. .........................................B44d 1/44, B32b 7/10
[58] Field of Search..........................117/62.1, 62.2, 155 UA

[56] References Cited

UNITED STATES PATENTS

| | | | |
|---|---|---|---|
| 2,655,864 | 10/1953 | Newman | 117/62.2 |
| 2,455,936 | 12/1948 | Lowe | 117/62.2 |
| 3,256,810 | 6/1966 | Ensink | 117/155 |
| 2,698,259 | 12/1954 | Trosset et al. | 117/62.2 |
| 3,063,863 | 11/1962 | Holland et al. | 117/155 |
| 3,076,720 | 2/1963 | Rice et al. | 117/155 |
| 3,476,582 | 11/1969 | Imoto et al. | 117/62.2 |
| 3,218,191 | 11/1965 | Domanski | 117/155 |
| 3,438,808 | 4/1969 | Hawkins et al. | 117/155 |
| 3,477,970 | 11/1969 | Beeman | 117/155 |
| 3,365,408 | 11/1968 | Ohara et al. | 117/155 |
| 3,481,764 | 12/1969 | Matsumoto et al. | 117/155 |
| 3,429,735 | 2/1969 | Bridgeford | 117/155 |

*Primary Examiner*—William D. Martin
*Assistant Examiner*—M. Sofocleous
*Attorney*—McLean, Morton & Boustead

[57] ABSTRACT

A method of manufacturing coated VIII of which comprises treating paper which is coated with a coating color composition composed essentially of a pigment, a PVA or a derivative thereof, and a latex, with a treating solution composed essentially of three components including from about 1 to 9 parts of a salt of a metal of Group II, III, IV or VIII of the Periodic Table which combines with the PVA or derivative thereof, to form a chelate compound, from about 1 to 9 parts of boric acid [a nonmetallic compound] which combines with the PVA or derivative thereof to have a joint tackifying or gelling action, and from about 0.001 to 1 part of a surface active agent. The coated paper obtained by the method of the invention has superior water resistance and offset printability qualities and in addition possesses extremely improved luster on the finished surface.

5 Claims, No Drawings

METHOD OF MANUFACTURING COATED PAPER

This invention relates to a method of manufacturing coated paper and has for its object the provision of a method for the production of coated paper having excellent offset printability, good water resistance and luster on the coated surface.

Coating solutions for high class printing paper including compositions consisting of pigments, casein and latices have often been used, and it is a recent tendency that polyvinyl alcohol (hereinafter referred to as PVA) be used to replace the casein because of the greater bond strength and workability of the composition so formed. PVA provides high bonding strength owing to excellent film forming ability and resistance to oils and greases, but at the same time has some defects in connection with water resistance, luster on the coated surface, offset printability, ink setting, and viscosity.

In order to overcome such drawbacks of PVA, it has hitherto been proposed to introduce other hydrophilic groups such as carboxyl, sulfonyl, phosphoryl, pyrrolidyl groups or the like, or hydrophobic groups such as lauryl, octyl groups or the like into the molecule PVA for example, by the copolymerization of the vinyl ester from which the PVA is produced with a monomer capable of copolymerizing with the vinyl ester and saponifying the copolymerization product. Suitable vinyl esters are vinyl formate, vinyl acetate, vinyl propionate, etc. For example, when vinyl acetate is used suitable monomers are unsaturated monocarboxylic acids, unsaturated dicarboxylic acids, the anhydrides of such acids, etc., including by way of illustration such compounds as acrylic acid, crotonic acid, isocrotonic acid, maleic acid, vinyl sulfonate, vinyl pyrrolidone, vinyl lauryl other or the like. The desired groups can be introduced also by graft polymerization or by the reaction of PVA with phosphoric acid or the like. It has also been proposed to use glyoxal, melamine formaldehyde resin, urea formaldehyde resin or the like in admixture with a PVA coating color composition. However, none on these proposals has proved fully satisfactory.

With the view to attain improvements in this respect, the present inventors have invented a process for treating PVA-coated paper surface with an aqueous solution of a salt of a multivalent metal from Groups II, III, IV or VIII of the Periodic Table. The present invention is based on the concept that such an aqueous solution of multivalent metal salt enhances the water resistance and offset printability of PVA-coated paper, and is itself an improvement.

More specifically, the present invention concerns a method of manufacturing coated paper which comprises treating paper which is coated with a coating color composition composed essentially of a pigment, PVA, or a derivative thereof, and a latex, with a treating solution composed essentially of three components including from about 1 to 9 parts of a salt of a multivalent metal of Group II, III, IV or VIII of the Periodic Table which combines with the PVA, or derivative thereof, to form a chelate compound, from about 1 to 9 parts of boric acid which combines with the PVA or derivative thereof to have a joint tackifying or gelling action, and from about 0.001 to 1 part of a surface active agent. The coated paper obtained by the method of the invention has superior water resistance and offset printability qualities and in addition possesses extremely improved luster on the finished surface.

Salts of the metals of Groups II, III, IV or VIII of the Periodic Table to be used in the treating solution according to the present invention are those which combine with PVA's, or derivatives thereof, to form chelate compounds. The salts make the PVA's, or derivatives thereof, on the coated paper insoluble in water, thereby rendering the paper surface water-resistant and include, but are not limited to, inorganic salts such as the chlorides, sulfates, nitrates, etc., of the metals and organic salts including metal alkylates, e.g., lower alkylates such as those containing up to about six carbon atoms, metals salts of lower carboxylic acids, e.g., acylates containing up to about six carbon atoms and including salts of mono- and polycarboxylic acids and hydroxy substituted carboxylic acids. Exemplary salts are, for example, stannic chloride, stannous chloride, zirconium chloride, titanium chloride, zirconium sulfate, stannic sulfate, titanium butyrate, triethanolamine titanate, titanium oxalate, titanium citrate, titanium tartanate and other titanium chelate compounds, thallous chloride, aluminum chloride, aluminum sulfate, aluminum nitrate, aluminum acetate, basic aluminum acetate, aluminum propionate, basic aluminum propionate, ferric nitrate, cadmium chloride, zinc chloride, zinc sulfate, barium chloride, calcium chloride, and magnesium chloride. In use the salts may be employed either singly or in a mixture of two or more.

The boric acid for use in the treating solution combines with the PVA, or derivative thereof, to have a tackifying or gelling action. Such compounds typically instantaneously react with the PVA, or derivative, to be cross linked therewith, and this cross linking combines with the action of the salt of a metal of Group II, III, IV or VIII of the Periodic Table to make the PVA or derivatives thereof on the coated paper all the more water-insoluble and to improve the luster of the coated surface.

The surface active agent to be used in the treating solution is one which will serve to decrease the surface tension of the solution and thereby permit the treating solution to be uniformly applied on the PVA-coated paper. It also serves to render the surface of coated paper hydrophobic. While all kinds of surface active agents are known to be useful for this purpose, those of HLB10 or less which are more hydrophobic are preferred.

The treating solution of this invention is applied to the paper with the color coating composition generally in an amount sufficient to improve the water resistance and offset printability qualities thereof. Such amounts will vary depending upon the type of paper used, the particular coating composition, etc., but will generally be between about 0.1 and 10 g./m.$^2$ in dry basis, preferably between about 0.5 and 5 g./m.$^2$ in dry basis.

The most effective mixing ratios of the three components in the treating solution for use in the present invention are: from about 1 to 9 parts of a salt of a metal of Group II, III, IV, or VIII of the Periodic Table which combines with the PVA or derivative thereof to form a chelate compound, from about 1 to 9 parts of boric acid which combines with the PVA or derivative thereof to exert a tackifying or gelling action, and from about 0.001 to 1 part of the surface active agent. Outside these ranges of mixing ratios, the coated paper to which the present invention is directed cannot always be obtained.

The PVA's useful in this invention include completely saponified PVA partially saponified PVA or copolymers of PVA with other unsaturated, polymerizable monomers, for instance, vinyl ether, allyl alcohol, etc. The PVA may be added to the pigment as a solution in water and the concentration of PVA in the composition may vary depending upon the particular degree of polymerization of the PVA but conventional, e.g., minor concentrations, such as about 1 to 25 percent, preferably about 5 to 20 percent by weight based on total solids are generally preferred.

PVA derivatives are also used in the coating composition according to the invention. Such PVA derivatives include those formed by introducing another hydrophilic group such as carboxyl, sulfonyl, phosphoryl, pyrrolidyl groups or the like, or hydrophobic groups such as lauryl, and octyl groups into PVA using acrylic acid, crotonic acid, isocrotonic acid, maleic acid, vinyl sulfonate, vinyl pyrrolidone, vinyl lauryl ether and the like. Latices or latexs for use in the coating solution include styrene-butadiene, methyl methacrylate-butadiene, ethylene-vinyl acetate, acrylic acid ester, and vinyl acetate. Where desired, the coating color may contain suitable amounts of melamine formaldehyde resin, glyoxal or the like which are waterresisting agents for PVA's and PVA derivatives, in addition to a pigment, PVA or a derivative thereof, and a latex. The pigment of the color composition in this invention is generally the major component of the solids and is of the type ordinarily used in paper coating. Illustrative pigments are various siliceous materials such as clay, kaolinite, silica and the like, and especially inorganic oxides. The amount of pigment can vary but most advantageously is at least about twice the amount of PVA and may be up to about 15 to 25, or more, time by weight the amount of PVA.

The present invention will now be described in more detail in connection with the following examples which are in no way restrictive.

EXAMPLE I

One hundred parts of clay was dispersed in water to form a 70 percent slurry. Five parts on dry basis of a 10 percent solution of PVA (polymerization degree 1750, saponification degree 98.5 mole), 0.5 part on dry basis of melamine formaldehyde resin, and 11 parts on dry basis of styrene-butadiene copolymer latex were added to the slurry. The mixture was thoroughly stirred, and a 40 percent coating color was obtained.

The resulting coating color was applied over a cardboard at a rate on dry basis of 15 g./m.$^2$. After drying at 100° C. for 2 minutes, specimens of the coated paper were further coated with eight different types of coating solutions, namely, (1) water, (2) a 5 percent aqueous solution of aluminum sulfate, (3) a 5 percent aqueous solution of boric acid, (4) a 0.1 percent aqueous solution of Epan 410 (a nonionic surface active agent made by Daiichi Kogyo Co.); constitutional formula of

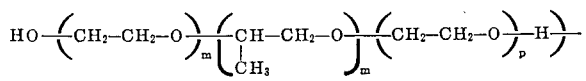

(5) a 10 percent aqueous solution of a 1:1 mixture of aluminum sulfate and boric acid, (6) a 10.1 percent aqueous solution of a 50:50:1 mixture of aluminum sulfate, boric acid and Epan, (7) a 5.05 percent aqueous solution of a 100:1 mixture of boric acid and Epan 410, and (8) a 10 percent aqueous solution of a 1:1 mixture of boric acid and aluminum acetate, at a rate of 22 g./m.$^2$ each. Next, the coated paper specimens were passed twice through a supercalender under the conditions of a temperature of 70° C., calender pressure of 10 kg./cm.$^2$, and calendering speed of 40 meters per minute. Then the effects of the different treating agents were compared. The results are shown in Table I.

TABLE I

| No. of treating agent | Treating agent | Water resistance [1] | Offset print- ability [2] | Coated surface gloss [3] | Printed ink gloss, percent |
|---|---|---|---|---|---|
| 1 | Water | 2.5 | Poor | 29.8 | 58.1 |
| 2 | 5% boric acid | 3.5 | do | 29.9 | 59.5 |
| 3 | 5% aluminum sulfate | 3.5 | Good | 31.3 | 57.7 |
| 4 | 0.1% Epan 410 | 3 | do | 31.0 | 57.9 |
| 5 | 10% aluminum sulfate/boric acid (1:1) | 4 | do | 30.7 | 59.9 |
| 6 | 10.1% aluminum sulfate/boric acid Epan 410 (50:50:1) | 4.5 | do | 32.3 | 57.7 |
| 7 | 5.05% boric acid/ Epan 410 (100:1) | 4.5 | do | 30.9 | 53.7 |
| 8 | 10% boric acid/ aluminum acetate | 4.5 | do | 32.0 | 63.8 |

[1] Water-resistance was evaluated by placing each test specimen on a sheet of black paper, wetting the specimen with water by a finger tip, allowing it to stand for one minute, rubbing the surface five times with an index finger, and then observing the white turbidity which appears on the black paper. The result was expressed in terms of a numerical value between 1 and 5. The larger the value, the better. Accordingly, numeral 1 denotes poor water-resistance and 5 denotes good water-resistance.
[2] Offset printability was evaluated on the basis of the results of two testing methods A and B. Testing method A consisted of dripping 0.1 cc. of an etching solution on a coated surface, and immediately solid printing the paper specimen using one gram of snap dry ink, blue turquoise in color, of Dai Nippon Ink & Chemicals Inc. with a printing pressure of 100 kg. and observing the receptivity of the ink. Testing method B consisted of printing the paper specimen with snap dry ink Hi, ZF59, blue in color, of Dai Nippon Ink & Chemicals Inc., dripping water drops on the printed surface, and wiping the water off after standing for the different periods of 2, 5, 10, and 30 minutes, and then observing the degree of destruction of the printed surface.
[3] Coated surface gloss and printed ink gloss were determined using AKA spectrophotometer. Printed ink gloss was obtained by printing each specimen with F-Gross 85, "sumi" black ink of Dai Nippon Ink & Chemicals Inc.

As can be seen from the results given in Table I, the ternary mixed treating agent of No. (6) which consisted of aluminum sulfate, boric acid, and Epan 410 gave better water-resistance, offset printability, and coated surface gloss to the coated surface than did other treating agents tested.

EXAMPLE II

Cardboard coated under the same conditions as in Example I was additionally coated with the following treating agents and the results were compared.

The mixing ratio of the metallic salt/PVA tackifier/surface active agent in each treating solution tested was 4:6:0.2.

Although five different types of treating agents were employed as listed below, they gave results almost equal to that attained by the aluminum sulfate/boric acid/Epan 410 system.

1. Stannic chloride/boric acid/Epan 410
2. Zirconium chloride/boric acid + borax (8:2)/Epan 410
3. Aluminum acetate/boric acid/sodium dodecylsulfonate
4. Zinc sulfate/boric acid + borax (8:2)/sodium stearate
5. Ferric nitrate/boric acid/calcium stearate

EXAMPLE III

One hundred parts of clay was mixed with 0.4 parts of sodium hexamethaphosphate and water to prepare a clayey slurry with a consistency of 65 percent. Five different types of binder systems as listed below were admixed with the clayey slurry and five different coating colors were formed.

1. Six parts on net basis of a 20 percent solution of PVA (polymerization degree of PVA 550, sulfuric-esterification degree 2 mole percent), one part on pure basis of malamine formaldehyde resin, and 10 parts on dry basis of styrene-butadiene latex.
2. Six parts on net basis of 15 percent solution of sulfuric-esterified PVA (polymerization degree of PVA 550, sulfuric-esterification degree 2 mole percent), one part on net basis of melamine formaldehyde resin, and 10 parts on dry basis of styrene-butadiene latex.
3. Six parts on net basis of a 15 percent solution of phosphoric-esterified PVA (polymerization degree of PVA 550, phosphoric-esterification degree 4.0 mole percent), 1.2 parts on net basis of urea formaldehyde resin, and 10 parts on dry basis of methyl methacrylate-butadiene copolymer latex.
4. Six parts on net basis of a 12 percent solution of a PVA derivative which is a product of copolymerization of vinyl acetate with lauryl vinyl ether (polymerization degree of PVA 550, containing 0.2 mole percent of lauryl vinyl ether), 1 part on net basis of glyoxal, and 10 parts on dry basis of acrylic ester copolymer latex.
5. Six parts on net basis of a 15 percent solution of PVA copolymerized with crotonic acid (polymerization degree of PVA 550, containing 5 mole percent of crotonic acid), 1 part on net basis of melamine formaldehyde resin, and 10 parts on dry basis of ethylene-vinyl acetate copolymer latex.

The five types of coating colors thus obtained were adjusted to a concentration of 50 percent each, applied on paper, and dried at 100° C. for 2 minutes.

Next, a 10 percent treating solution of 7 parts of aluminum sulfate, 2 parts of boric acid, 1 part of borax, and 0.05 part of a anionic surface active agent Igepon T made by I.G. Farben Industrie Co., (Germany) (with a structural formula of

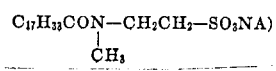

was applied on the five paper specimens at a rate of 20 g./m.² each, supercalendered three times under the conditions of a temperature of 70° C., calender pressure of 20 kg./cm.², and revolution speed of 40 m./min., and then the treated specimens were tested for water-resistance, offset printability, coated surface gloss, and printed ink gloss. The test specimens invariably showed satisfactory results.

The embodiments of the invention in which an exclusive property or privilege is claimed are defined as follows:

1. A method of manufacturing coated paper having improved water resistance and offset printability which comprises coating paper with an aqueous coating solution containing a siliceous pigment and polyvinyl alcohol, and applying to the coated paper an aqueous treating solution containing (A) from about 1 to 9 parts of a metallic salt which combines with the polyvinyl alcohol to form a chelate compound, said metallic salt being a salt of at least one metal selected from the group consisting of tin, zirconium, titanium, thallium, aluminum, iron, cadmium, zinc, barium, calcium and magnesium, (B) from about 1 to 9 parts of boric acid and (C) from about 0.001 to 1 part of surface active agent.

2. The method of claim 1 wherein the surface active agent has an HLB of not more than 10.

3. The method of claim 1 wherein the aqueous coating solution contains a latex selected from the group consisting of styrene-butadiene copolymer, methyl methacrylate-butadiene copolymer, ethylene-vinyl acetate copolymer, polyacrylic acid ester and polyvinyl acetate.

4. The method of claim 1 wherein the metallic salt is selected from the group consisting of the chlorides, sulfates and nitrates of said metal.

5. The method of claim 1 wherein the metallic salt is selected from the group consisting of the lower alkylates and lower acylates of said metal.

* * * * *